United States Patent
Girardeau

(10) Patent No.: US 9,471,206 B2
(45) Date of Patent: Oct. 18, 2016

(54) SYSTEM AND METHOD FOR MULTI-DIMENSIONAL MODELING OF AN INDUSTRIAL FACILITY

(71) Applicant: UPTIME SOLUTIONS, Jacksonville, FL (US)

(72) Inventor: James Girardeau, Austin, TX (US)

(73) Assignee: UPTIME SOLUTIONS, Jacksonville, FL (US)

( * ) Notice: Subject to any disclaimer, the term of this patent is extended or adjusted under 35 U.S.C. 154(b) by 377 days.

(21) Appl. No.: 14/104,328

(22) Filed: Dec. 12, 2013

(65) Prior Publication Data

US 2015/0169190 A1  Jun. 18, 2015

(51) Int. Cl.
*G06F 3/048* (2013.01)
*G06F 3/0484* (2013.01)
*G06F 3/0481* (2013.01)

(52) U.S. Cl.
CPC ....... *G06F 3/04842* (2013.01); *G06F 3/04815* (2013.01); *G06F 3/04817* (2013.01)

(58) Field of Classification Search
CPC ........... G06F 3/04842; G06F 3/04815; G06F 3/04817
USPC ...................................................... 715/771
See application file for complete search history.

(56) References Cited

U.S. PATENT DOCUMENTS

| | | | |
|---|---|---|---|
| 6,405,145 B1 * | 6/2002 | Rust ........................ | G06F 9/455 702/121 |
| 6,697,754 B1 * | 2/2004 | Alexander ............. | G01R 13/22 702/119 |
| 7,134,081 B2 * | 11/2006 | Fuller, III ............. | G06F 9/4443 714/712 |
| 7,340,737 B2 * | 3/2008 | Ghercioiu ................ | G06F 8/60 709/216 |
| 7,356,046 B2 * | 4/2008 | Harley, Jr. .......... | H04L 63/0428 370/352 |
| 7,984,423 B2 * | 7/2011 | Kodosky ............ | G05B 19/0426 715/763 |

\* cited by examiner

*Primary Examiner* — David Phantana Angkool

(57) ABSTRACT

A facility modeling system renders graphical representations of machines and their environment in a facility model to facilitate monitoring of machine parameters and health. A sensor control module communicates with a plurality of sensors detecting machine parameter data for machines housed in a facility. The machine parameters may include any information that may directly or indirectly indicate the status of a machine or a part of a machine. The information collected from the sensors is incorporated into the facility model (a graphical rendering of the facility) which may provide any of a variety of multi-dimensional views of the facility. A GUI allows a user to navigate through the facility model to identify and monitor the status of the sensors. The sensor status may be indicated by an icon, callout, change in a display characteristic of a facility, machine, part, space, or item, a combination of these, and the like.

22 Claims, 10 Drawing Sheets

SYSTEM AND METHOD FOR MULTI-DIMENSIONAL MODELING OF AN INDUSTRIAL FACILITY

BACKGROUND

1. Field of the Disclosure

The present disclosure relates generally to industrial facilities and, more particularly, to monitoring of machine parameters in industrial facilities.

2. Description of the Related Art

Industrial facilities, such as manufacturing facilities, laboratories, research facilities, refineries, and the like, require constant monitoring of machine parameters to ensure that the machines will continue to work properly. In many cases each machine, room, or area is equipped with one or more sensors that monitor machine parameters. Often times these sensors have to be checked manually, requiring a significant amount of time and attention to physically check each machine or even each sensor in a given facility on a regular basis. Some sensors are configured to sound an alarm when certain machine parameters have been detected as exceeding a threshold, but these alarms can be disruptive and provide limited configuration and data. In some instances, the sensor data is collected and temporarily stored in a database so that it can be accessed in the form of a chart, which can be densely populated, making it difficult and tedious to identify problematic machine parameters or the location of a given machine or sensor, and requiring several steps of identification before a given problem can be assessed. This inability to appropriately monitor and address machine parameters may lead to machine failure, inefficiencies, greater expense, and safety concerns.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate example implementations of a facility modeling system that renders graphical representations of machines and their environment within a facility to facilitate effective monitoring of machine parameters and health. A sensor control module communicates with a plurality of sensors detecting machine parameter data for machines housed in a facility (which itself may be a machine). The machine parameters may include, for example, temperature, vibration, stress, acceleration, velocity, pressure, liquid level, gas level, gas concentration, sound, electric field, speed, torque, displacement, and any other information that may directly or indirectly indicate the status of a machine or a part of a machine, or an environment in which a machine is located. The information collected from the sensors is incorporated into a facility model (a graphical rendering of the facility) which may be presented using any of a variety of multi-dimensional views, for example, two-dimensional (2D) views, three-dimensional (3D) views, views comprising additional non-spatial dimensions (such as time), a combination of these, and the like. The facility modeling system provides a graphical user interface (GUI) that allows a user to navigate through the facility model to identify and monitor the status of the sensors. The sensor status may be indicated by an icon, callout, change in a display characteristic of a facility, machine, part, space, or item, a combination of these, and the like. The facility modeling system further provides user customization features. For example, filter customization settings allow a user to select which sensors are displayed, what are the sensor statuses, and how each sensor status is indicated. Routes can also be defined based on a sequence of user-selected scene views or automatically based on a parameter, such as sensor status.

As used herein, the term "machines" refers to a structure or combination of structures subject to environmental changes or mechanical forces, either self-generated or externally applied. Structures with self-generated mechanical forces include, for example boilers, compressors, generators, transformers, industrial robots, rotating bearings, mills, lathes, grinders, saws, welders, ovens, mining equipment, and the like. Structures with externally applied mechanical forces include, for example, bridges and other spans, buildings, cranes, boat hulls, highways, and the like. Moreover, it will be appreciated that some machines may comprise structures subject to both self-generated mechanical forces and externally-applied mechanical forces.

Figure 1:
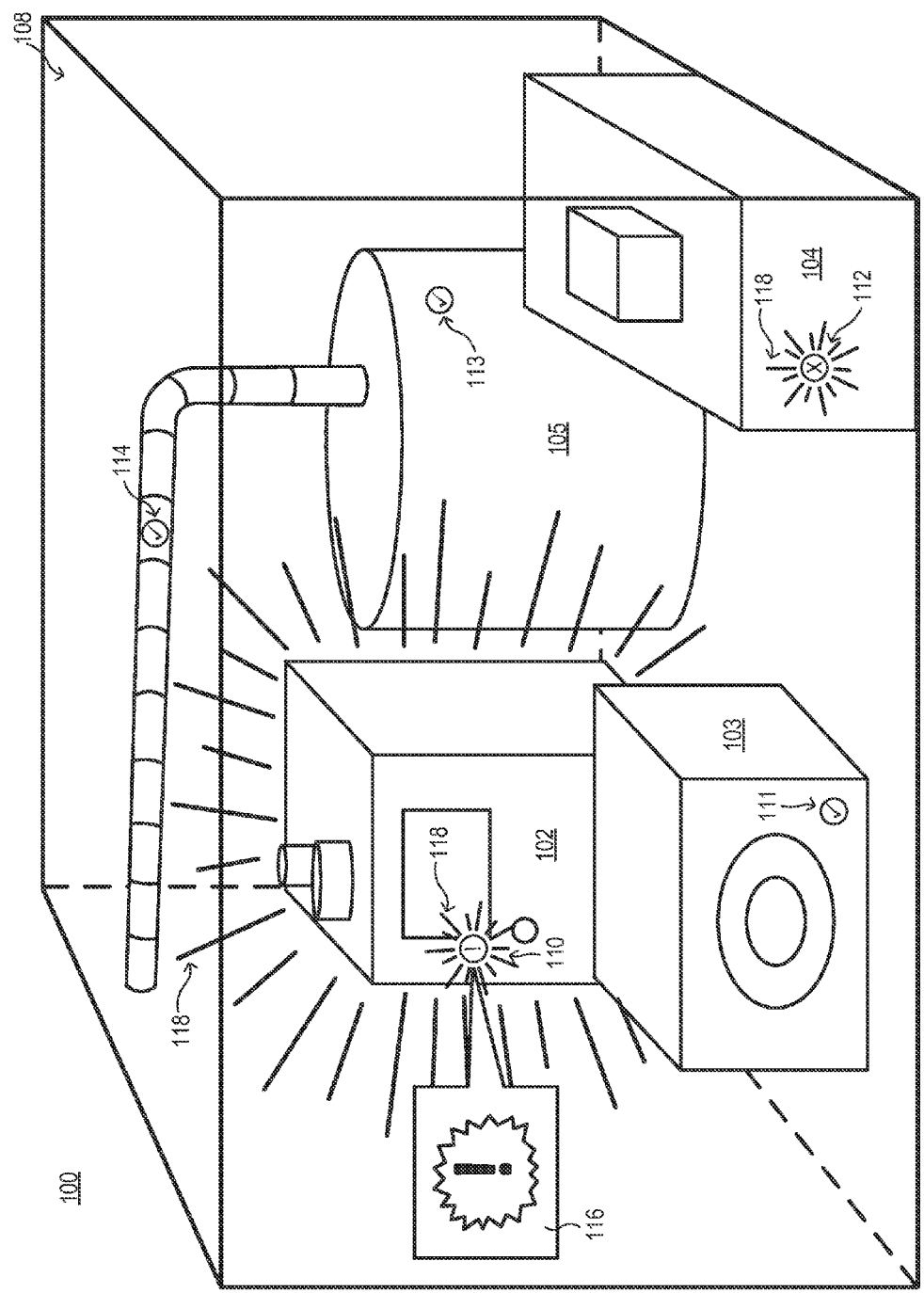
FIG. 1 is a view of a three-dimensional (3D) facility model depicting a plurality of machines within a facility and a graphical representation of a plurality of sensors that sense machine parameters in accordance with some embodiments.

FIG. 1 is a view of a 3D facility model 100 provided by a facility modeling system in accordance with at least one embodiment of the present disclosure. The facility model 100 depicts a graphical representation of a subset of machines 102, 103, 104, 105 of the plurality of machines within a facility, a graphical representation of a facility portion 108, and a graphical representation of at least one metric of a subset of sensors 110, 111, 112, 113, 114 associated with the subset of machines 102, 103, 104, 105.

The subset of sensors 110, 111, 112, 113, 114 comprising a subset of the plurality of sensors within the facility that sense machine parameters. Different facilities and embodiments may monitor or depict as machines any of a variety of structures subject to environmental changes or mechanical forces, either self-generated or externally applied, for example, boilers, compressors, generators, transformers, industrial robots, rotating bearings, mills, lathes, grinders, saws, welders, ovens, mining equipment, cranes, bridges and other spans, boat hulls, highways, buildings, and the like. The subset of sensors 110, 111, 112, 113, 114 are positioned so as to detect any of a variety of machine parameters, for example, temperature, vibration, stress, acceleration, velocity, pressure, liquid level, gas level, gas concentration, sound, electric field, speed, torque, displacement, or any other information that may directly or indirectly indicate the status of any of machines 102, 103, 104, 105 or a part of a machine. For example, the machine parameters may indicate that a machine is on, off, sleeping, paused, normal, near failure, healthy, unhealthy, broken, partially functioning, performing below standard, performing above standard, malfunctioning, in need of maintenance, in need of calibration, etc. In some embodiments, the machines are not housed in a facility, and instead the facility model may represent the machines alone, relative to each other, or relative to their surroundings.

The sensors 110, 111, 112, 113, 114 may be coordinated with threshold information, such that a sensor status indicates the sensed machine parameter relative to the threshold information. For example, a normal sensor status indicates the machine parameter is within a normal range, and an urgent status indicates that the machine parameter has exceeded a threshold and is in an urgent range. Different embodiments may employ any number and type of thresholds and related statuses, and a machine parameter exceeds a threshold when it has dropped below a lower threshold or risen above an upper threshold. In some embodiments, the graphical representation of the sensors 110, 111, 112, 113, 114 may comprise an icon that indicates the sensor status. In the illustrated embodiment, icons 111, 113, 114 are depicted as a "check mark" which may indicate that a machine is functioning normally, or otherwise that the sensors are detecting machine parameters within a normal range. Icon 112 is depicted as an "X," which may indicate that the machine is off, that the sensor is offline, or that the sensor is otherwise not reading or communicating a machine parameter. Icon 110 is depicted as an "!", which may indicate that the machine is near failure, operating under dangerous conditions, or otherwise that the machine parameter is detected by the sensor as having exceeded a particular threshold. While the icons 110, 111, 112, 113, 114 are depicted as symbols, in other embodiments any or all of the icons may be depicted as a different symbol, a callout (such as callout 116), a combination of these, and the like.

In some embodiments, each icon may represent more than one sensor. For example, in the depicted embodiment, one or more of icons 110, 111, 112, 113, 114 may each represent a plurality of sensors in their respective machines 102, 103, 104, 105, such that the "attention" or "!" icon 110 indicates that at least one of the represented sensors of machine 102 has detected a machine parameter that has exceeded the predetermined threshold, the "X" icon 112 indicates that at least one of the represented sensors of machine 104 is offline or otherwise not communicating a reading of a machine parameter, and the "check mark" icons 111, 113, 114 indicates that all of the represented sensors within machines 103, 105 are within the normal range.

Additionally, in some embodiments a visual attribute 118 of the relevant machine, facility, area, part, or sensor will change to indicate the sensor status. As such, reference throughout this disclosure to an appearance of a facility, area, room, level, floor, machine, part, or sensor in the model applies to the graphical representation of, not the actual facility, area, room, level, floor, machine, part, or sensor. For example, in some embodiments, the (graphical representation of) the machine, facility, area, part, or sensor may glow, change color, become bolder, blink, pulse, have indicator lines or callouts, become larger, display a pattern, a combination of these, and the like. As a further example, the graphical representation of machine 102 may glow red due to the status of the sensor(s) associated with icon 110, while the graphical representation of machine 104 may glow yellow due to the sensor(s) associated with icon 112, and machines 103, 105 may glow green, or not at all since all of the machine parameters are within their normal ranges (as indicated by icons 111, 113, 114).

Figure 2:
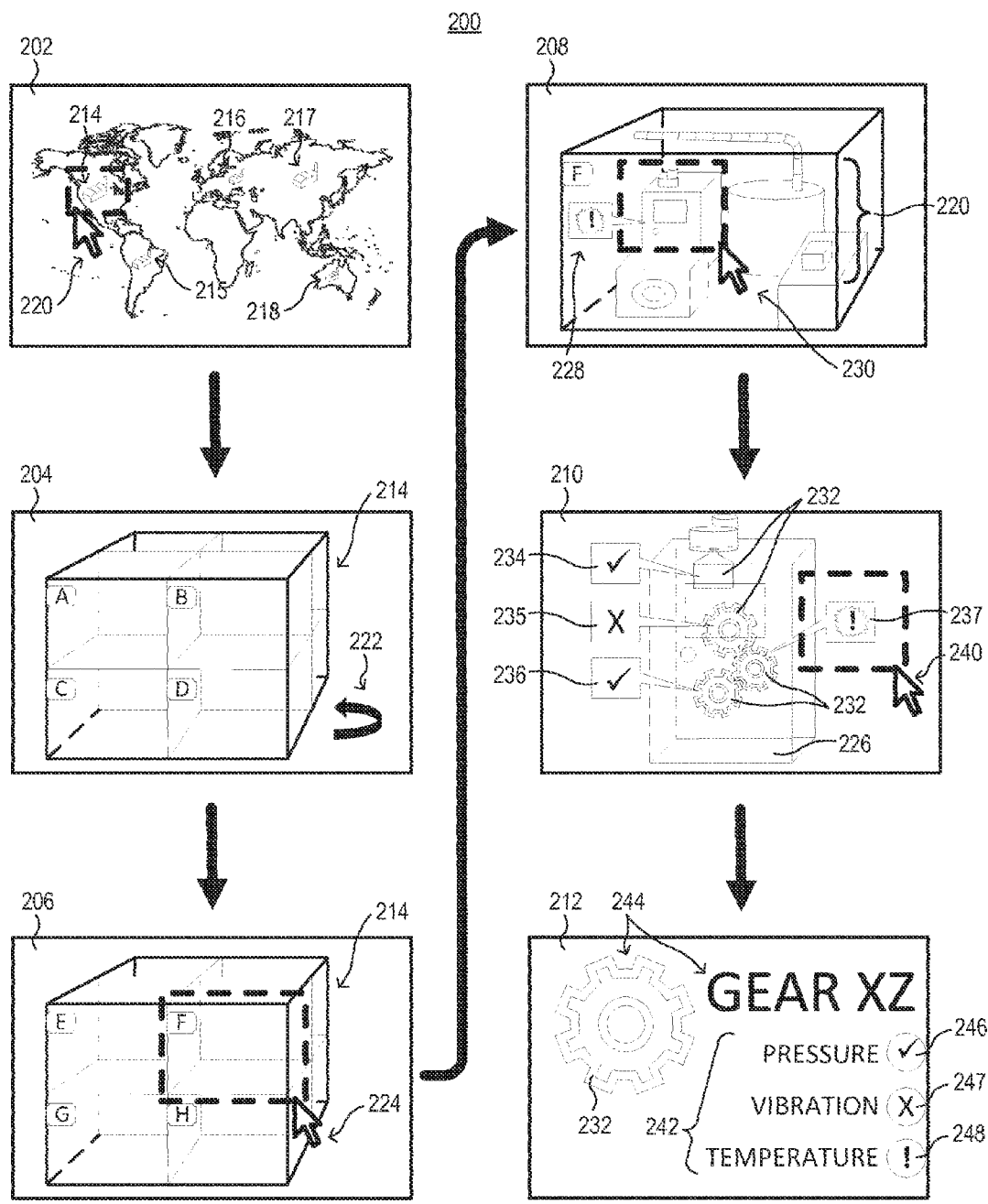
FIG. 2 is a flow diagram illustrating an example process of displaying a facility model and machine parameter data in response to user input in accordance with some embodiments.

FIG. 2 is a flow diagram illustrating an example process 200 of displaying a facility model and machine parameter data in response to user input in accordance with some embodiments. The process 200 depicts a sequence of scenes 202, 204, 206, 208, 210, 212 of the 3D facility model 100 that may be displayed for a user in response to user input in an effort to monitor machine parameters. Scene 202 depicts a map of the world showing locations of available facilities 214, 215, 216, 217, 218. In some embodiments, scene 202 may depict available facilities 214, 215, 216, 217, 218 in any of a variety of ways, for example, a pull-down menu, a map of a region, country, state, city, or continent, icons, a chart, a combination of these, and the like. The facilities may differ in type, size, location, machines, sensors, a combination of these, and the like. In some embodiments, there may be only one available facility, in which case scene 202 could be skipped, or may still require a selection of the facility.

User input 220 is received in the form of a selection of a facility 214. The user input 220 may be provided via a mouse, a keyboard, a touchscreen, a combination of these, and the like, to navigate the facility model and customize settings. For example, in the illustrated embodiment, a cursor is operated to "click" on or otherwise select the desired facility 214. In some embodiments the graphical user interface (GUI) may be configured such that in order for a user to select a facility, the user must click on or near the graphical representation of the facility, type in a command, select from a dropdown list, draw a selection box around the graphical representation of the facility, a combination of these, and the like. Further, in some embodiments, the user may select a facility by using zoom or jump commands or buttons. Scene 204 displays the selected facility 214 in response to the user input 220. Scene 204 depicts a perspective view of a 3D model of the facility 214 such that the user is viewing rooms A, B, C, D. In some embodiments, scene 204 may display a list of available rooms or scenes within the facility, a two-dimensional (2D) model of the facility 214, an entrance view of the facility as if the user has just arrived at the facility, and the like. Further, a room may represent multiple rooms, or a region, in the actual facility. In some embodiments, the model of the facility 214 may represent features of the facility 214, or the contents of the facility 214, based on ease of viewing rather than actual appearance of the physical facility. For example, the model could be organized based on machine type, sensor status, or any organization that makes monitoring the machine parameters more efficient or convenient. Navigation controls are provided to the user, such that the user can manipulate the view focus or navigate to a next scene view. For example, in some embodiments, the navigation controls may comprise pan, flyover, zoom in, zoom out, rotate, zoom selection, jump in, jump out, a combination of these, and the like. In the illustrated embodiment, user input 222 rotates the model of the facility 214 approximately 180° such that the user is no longer viewing rooms A, B, C, D.

Scene 206 displays the model of the facility rotated 180° in response to user input 222 such that the user is viewing rooms E, F, G, H, and rooms A, B, C, D are no longer being viewed. In some embodiments, some or all of the interior walls of the facility may be transparent or translucent such that at least a portion of rooms E, F, G, H would be "visible" through the interior walls in scene 204, and at least a portion of rooms A, B, C, D would be "visible" through the interior walls of scene 206. Further, in some embodiments the rooms A, B, C, D, E, F, G, H may show distinguishing features, such as some or all of the machines within the rooms, so that the user can choose a room based on the machines inside. Further, in some embodiments, information about the rooms, such as room number, wing of building, machines housed in the room, and the like, may be provided when the user manipulates a cursor to hover over a particular room. Further, the user may be alerted to rooms housing certain sensor statuses by changing one or more features of the room such as color, boldness, brightness, glow, a combination of these, and the like, or by adding an icon, a callout, a blink or pulse, a combination of these, and the like. That way a user can prioritize rooms based on sensors that may need more urgent attention. Once a user has decided on a room, user input 224 is received in the form of a selection of the room F. For example, in the illustrated embodiment, a cursor is operated to "click" on or otherwise select the desired room F. In some embodiments the graphical user interface (GUI) may be configured such that in order for a user to select a room, the user must click on or near the graphical representation of the room, type in a command, select from a dropdown list, draw a selection box around the graphical representation of the room, a combination of these and the like. Further, in some embodiments, the user may select a room by using zoom or jump commands or buttons.

Scene 208 depicts a more detailed view of the selected room F. In some embodiments, the user may navigate through the room F or the facility 214 with a first-person view as it would appear if the user was actually walking through the physical facility. In other embodiments the user may navigate through the room F or the facility 214 by using navigation controls such as pan, flyover, zoom in, zoom out, rotate, zoom selection, and the like. Depending on the level of detail shown in scene 208, the physical representation of the sensors, or a cluster of sensors discussed in FIG. 1 may also be shown. Alternatively, the machines 226 themselves may comprise one or more visual attributes 228 to indicate the status of one or more sensors associated with each machine 226. For example, in the illustrated scene 208, one of the machines 226 includes a visual attribute 228 in the form of a callout that may indicate one or more sensors that need attention within that machine 226. In other embodiments the machine 226 may glow, change color, become bolder, blink, have indicator lines, become larger, display a pattern, a combination of these, and the like. In some embodiments the user may cause a cursor to hover over a visual attribute 228 or a machine 226 to reveal more information about the sensors and their statuses. A user may then select any of the provided information, the visual attribute 228, or as in the depicted example, the user provides user input 230 in the form of a selection of a machine 226. In some embodiments the graphical user interface (GUI) may be configured such that in order for a user to select a machine, the user must click on or near the graphical representation of the machine, type in a command, select from a dropdown list, draw a selection box around the graphical representation of the machine, a combination of these and the like. Further, in some embodiments, the user may select the machine by using zoom or jump commands or buttons.

Scene 210 depicts the machine 226 in greater detail in response to the user input 228. The machine is depicted as translucent, such that at least a portion of the parts 232 are "visible" so as to indicate the location of the sensors and the parts affected by the machine parameters the sensors detect. Some, all, or none of the parts may be "visible" in other embodiments. Icons 234, 235, 236, 237 indicate the general location of sensors and relevant sensor statuses for sensors on or near the depicted parts 232. For example, the "check mark" icon 234, 236 may indicate that all of its represented sensors are within the normal range; the "X" icon 235 may indicate that at least one of the represented sensors is offline or otherwise not communicating a reading of a machine parameter; and the "attention" or "!" icon 237 may indicate that at least one of its represented sensors has detected a machine parameter that has exceeded the predetermined threshold.

In some embodiments, a "higher level" scene may change a visual attribute to reflect the most problematic status of its "lower level" components. For example, a facility may comprise a visual attribute to indicate the most problematic machine status of the plurality of machines within the facility; a machine may comprise a visual attribute to indicate its most problematic part status of the plurality of parts within the machine; and a part may have a visual attribute to indicate its most problematic sensor status of the plurality of sensors within the part. In the illustrated example, the "attention" or "!" icon 237 depicted in scene 210 is the cause of the visual attribute 228 of scene 208, to indicate that there is at least one sensor associated with the machine 226 that was detecting a machine parameter that had exceeded a preset threshold. While the icons 234, 235, 236, 237 are depicted as symbols in callouts, in other embodiments any of the icons may comprise a different symbol, a callout, a change in a visual attribute of an associate part 232, a combination of these, and the like. In some embodiments, more details related to the machine 226, its parts 232, and its sensors may be revealed when the user hovers the cursor over different aspects of the scene 210. Additionally, in the illustrated embodiment, further details related to a part 232 or an icon 234, 235, 236, 237 can be revealed in response to user input 240. In some embodiments, a user manipulates a cursor via a mouse, trackpad, or other control to hover over the part 232 or the icon 234, 235, 235, 237 to reveal further details.

Scene 212 depicts sensor information 242 for the part 232 associated with the selected icon 237 in response to the user input 240. In the illustrated example, the scene 212 depicts part information 244 including the name and an image of the part 232, sensor information 242 for one or more sensors detecting the machine attributes of pressure, vibration, and temperature, and icons 246, 247, 248 indicating sensor status. Of course the sensor information 242 and the part information 244 may be depicted in any of a variety of ways in different embodiments. For example, different icons could be used, the actual sensor readings or data may be displayed, graphical information related to the sensor readings may be provided, the part number or machine information could be provided, etc.

As illustrated, the "check mark" icon 246 may indicate that the sensor or sensors for the part 232 detect that the pressure is in a normal range; the "X" icon 247 may indicate that at least one sensor detecting vibration is offline or otherwise not communicating a reading; and the "attention" or "!" icon 248 may indicate that at least one sensor has detected temperatures that exceed a predetermined threshold. In the illustrated example, the "attention" or "!" icon 248 depicted in scene 212 is the cause of the "attention" or "!" icon 237 of scene 210, to indicate that at least one of the machine parameters associated with the relevant part 232 has exceeded a threshold.

Figure 3:
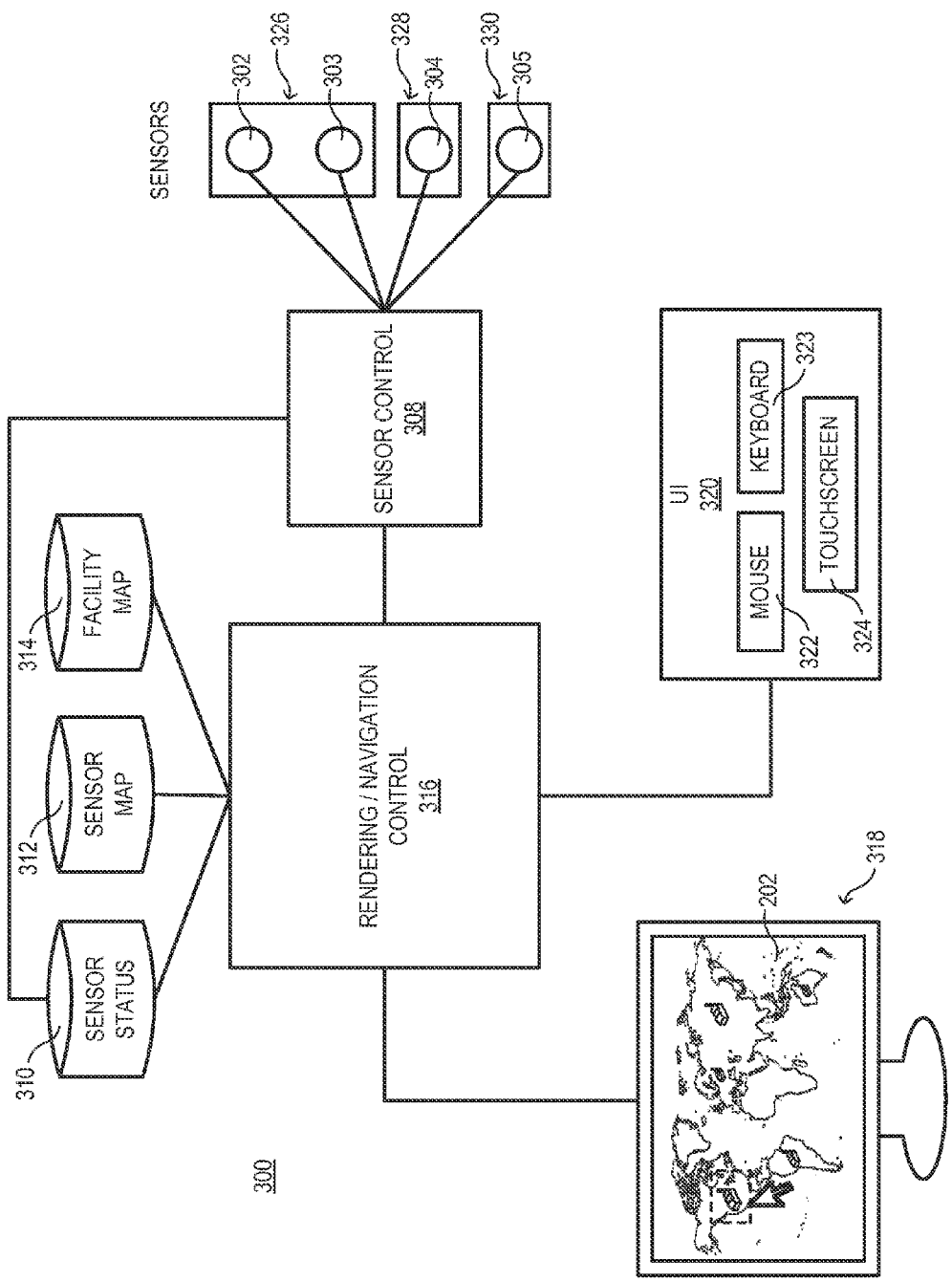
FIG. 3 is a block diagram of a facility modeling system in accordance with some embodiments.

FIG. 3 is a block diagram of a facility modeling system 300 in accordance with some embodiments. The facility modeling system 300 is to display the model 100 and receive user input to manipulate or navigate the model 100. The facility modeling system 300 comprises a plurality of sensors 302, 303, 304, 305 to detect machine parameters and health within a facility and communicate with a sensor control module 308 via a wired or wireless connection. In some embodiments the sensor control module 308 is a field unit located on or near the facility that samples the sensors 302, 303, 304, 305 at predetermined intervals, at predetermined times, between predetermined hours, at random, or a combination of these. Each of the sensors 302, 303, 304, 305 may comprise, for example, an accelerometer, a thermometer, a gas detector, a level detector, a velocity probe, a displacement probe, a pressure sensor, a sound level meter, an ultrasonic sensor, a humidity probe, a corrosion strip, a load cell, a resistance temperature detector (RDT), a proximity sensor, a tachometer, a combination of these, and the like. Each type of sensor can vary in form and output, and a typical sensor produces an analog output voltage, a current, or a digital representation of the parameter being measured. Each type of sensor also has a representative set of output parameters such as frequency range, voltage range, current range, temperature, impedance, a combination of these, or other electrical mechanical, or physical properties. Each sensor 302, 303, 304, 305 is located at or near one or more machines, areas, or parts to detect machine parameters. In some embodiments, a single sensor can sense multiple parameters. Further, a single machine, area, or part may comprise more than one sensor. In the illustrated embodiment, sensors 302, 303 are depicted together in group 326, while sensor 304 is depicted in group 328 and sensor 305 is depicted in group 330. These groups 326, 328, 330 may each represent a machine, an area, a part, a facility, a type of sensor, a type of machine, a sensor status, a combination of these, and the like. The groups 326, 328, 330 may be communicated by the sensors themselves, a GPS system, a database, user input, a table, and the like, or may be determined by the sensor control module 308.

The sensor control module 308 may further serve as an analyzer for the sensors 302, 303, 304, 305, by processing and converting the analog or other signals received from the sensors 302, 303, 304, 305 into a digital representation of the sensor data. The processing steps may include low-pass filtering, high-pass filtering, band-pass filtering, gain adjustment, nonlinear adjustments, noise mitigation, zero crossing detection, level detection, analog to digital conversion, or other types of linear or nonlinear processing steps. Nonlinear adjustments may include distortion correction, limiting, or rectification. It will be apparent to those skilled in the art that there are many possible processing steps and many ways to obtain digital data from analog data. In some embodiments, the sensor control module 308 may comprise extensive analysis capabilities, and can apply various time domain filters and analysis steps. Frequency domain analysis is also available in some embodiments of the sensor control module 308, whereby the processed time domain signal can be viewed in the frequency domain, allowing analysis of frequency dependent data. Multiple sensor outputs can be collected coherently by sensor control module 308 to produce multi-dimensional plots or to perform multi-dimensional analysis. In some embodiments, the sensor control module 308 comprises a concentrator, an analyzer and a selector, such that the sensor communication channels are connected to a concentrator at a central location, the analyzer is connected to the concentrator, and the selector is used to connect any one of the sensor communication channels to the analyzer.

In some embodiments, the sensor control module 308 includes detection methods to validate that the sensor 302, 303, 304, 305 appears to be the correct type of sensor, is operating correctly, and that the output parameters appear correct. The sensor control module 308 may further check for shorts or opens in the sensor 302, 303, 304, 305, lack of output activity, or other fault conditions. In some embodiments, the data will be rejected or marked as bad if the sensor parameters do not appear to be correct.

In the illustrated embodiment of the facility modeling system 300, the sensor control module 308 communicates the data received from the sensors 302, 303, 304, 305 with to a sensor status database 310. In some embodiments, the sensors 302, 303, 304, 305 may communicate directly with the sensor status database 310. In some embodiments, one or more of the sensors 302, 303, 304, 305, or the sensor control module 308 may communicate with a sensor map database 312 or a facility map database 314 to facilitate mapping information relative to the location of the sensor 302, 303, 304, 305. A rendering/navigation control module 316 communicates with the sensor status database 310, the sensor map database 312, the facility map database 314, and the sensor control module 308 to render a model of the facility, which includes a graphical representation of the relevant machines, and a graphical representation of at least a portion of the sensors 302, 303, 304, 305. Generally, the sensor status database 310 stores data related to information received from the sensors 302, 303, 304, 305 to facilitate creation of a graphical representation of current sensor statuses, sensor data, and in some instances, historical sensor data; the sensor map database 312 stores data related to the location of the sensors 302, 303, 304, 305 in relation to the facility; and the facility map database 314 stores data related to the locations of facilities, the layout of each facility and the machines within each facility. In some embodiments, the sensors 302, 303, 304, 305, or the sensor control module 308 may provide some of the sensor data directly to the rendering/navigation control module 316. The rendering/navigation control module 316 is in communication with a display 318 to display the rendered facility model and provide a graphical user interface (GUI). The display 318 may be, for example, a desktop display, a control room display, a portable display (e.g. tablet, or smartphone), a combination of these, and the like. The display 318 is depicted as displaying the map of the facilities in accordance with scene 202 of FIG. 2.

A user interface (UI) 320 in communication with the rendering/navigation control module 316, receives user input through a mouse 322, keyboard 323, touchscreen 324, a combination of these, and the like, to navigate the facility model and customize settings. The rendering/navigation control module 320 communicates information related to the user input to the sensor control module 308, the sensor status database 310, the sensor map database 312, the facility map database 314, and the display 318 as appropriate. For example, user input may customize settings such that a particular machine parameter should be sampled every minute and that if a particular threshold is reached for the machine parameter, the graphical representation of the sensor, the graphical representation of the machine, and the graphical representation of the facility, are all to glow red and blink every five seconds. After receiving this user input from the UI 320, the rendering/navigation control module 316 may communicate the sampling and threshold information to the sensor control module 308, so that the sensor control module 308 can communicate the sampling information to the relevant sensors 302, 303, 304, 305, and can use the threshold information to analyze the sensor status and communicate the appropriate sensor status to the sensor status database 310. Further, the rendering/navigation control module 316 communicates with the display 318 to display the graphical representations of the sensor, machine, and facility in accordance with the customized settings.

Figure 4:
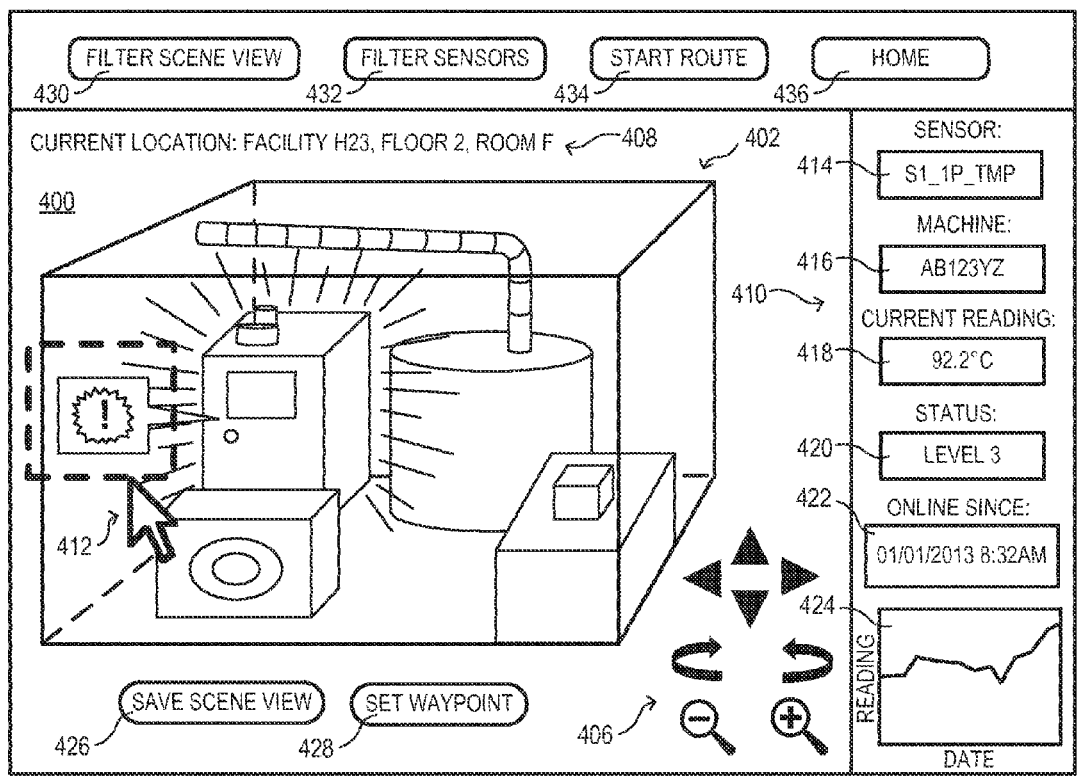
FIG. 4 is an example graphical user interface (GUI) for use with a facility model in accordance with some embodiments.

FIG. 4 is an example GUI 400 that the facility modeling system 300 of FIG. 3 uses to display the facility model on the display 318 and to receive user input via the user interface 320 in accordance with some embodiments. The GUI 400 may be implemented via, for example, proprietary software, a web browser, an application, a combination of these, and the like. A scene 402 of the facility is displayed for the user to view, navigate, and customize. A cursor 404, and navigation tools 406 are provided. The navigation tools 406 may include, for example, pan, zoom in/out, zoom selection, rotate, flip, pop in/out (allowing a user to "jump" levels within a facility or within a view hierarchy with a single command), and the like. Scene information 408 indicates the current location being viewed, for example, the scene 402 displayed in the illustrated embodiment is of room F on the second floor of Facility H23. A display frame 410 provides information related to user input 412 in the form of a selection or hovering over a component depending on the embodiment. In the illustrated embodiment, a "attention" or "!" icon has been selected as the user input 412. The display frame 410 indicates relevant information about the selected component. In the illustrated example, the "attention" or "!" icon represents a specific sensor. The display frame 410 provides a sensor identification number 414, a machine identification number 416 for the machine for which the sensor is detecting machine parameters, a current reading 418 of the sensor, a status of the sensor 420, a date 422 since which the sensor has been online, and a graph 424 representing the sensor readings over a period of time. The information displayed in the display frame 410 may be completely customizable based on facility, machine type, part type, sensor type, sensor status, etc. The status 420 may indicate severity based on different thresholds representing different levels of severity. One of these thresholds may be the length of time that the machine parameter has exceeded a given threshold. The thresholds and the statuses 420 may be customizable via the GUI 400.

The GUI 400 may further provide menus and user input mechanisms (e.g., buttons, pull-down lists, form fields, etc.) to provide quick access to other functions. To illustrate, a save scene view button 426 can be used to store the current scene view so that a user can quickly access the scene view again. A set waypoint button 428 allows the user to save the current scene view and focus as one waypoint of a route. A filter scene view button 430 allows the user to customize the current scene view 402. For example, the user may want to only view machines with certain alerts or icons, or may want to highlight these machines while graying out machines that are functioning normally. Some implementations may also allow customization for extending the visibility of the facility in the current scene view 402 (by making interior walls transparent or otherwise). A filter sensors button 432 allows the user to edit sensor filters and settings. For example, certain sensors may be disabled or thresholds may be customized. An example of filter customization settings is described in greater detail with reference to FIG. 8 below. A start route button 434 allows a user to start a predefined route. Routes are discussed in greater detail with reference to FIG. 7 below. A home button 436 allows a user to return to a home screen directly from the current scene view 402. The home button may be configured to return the user to any scene, for example a map of facilities view, a facility view, a start menu, etc. Many variations of the GUI 400 are possible and are understood to be encompassed by the present disclosure.

Figure 5:
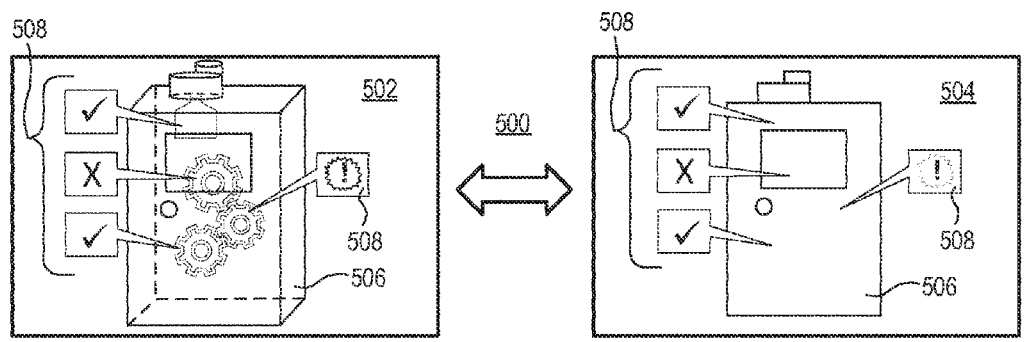
FIG. 5 is a diagram illustrating a switch between a 3D facility model scene view and a two-dimensional (2D) facility model scene view in accordance with some embodiments.

FIG. 5 is a diagram illustrating a switch between a 3D facility model view 502 and a 2D facility model view 504 in the 3D facility model 200 (FIG. 1) displayed via the GUI 400 (FIG. 4) in accordance with some embodiments. In some situations, it may be desirable to view a scene in 2D instead of 3D for clarity purposes, printing purposes, and the like. Some embodiments easily convert any given scene between the 3D facility model view 502 and the 2D facility model view 504. In the illustrated embodiment, the machine 506, and the icons 508 are depicted in both the 3D scene view 502 and the 2D scene view 504, but the parts 510 are only depicted in the 3D scene view 502. In other embodiments, at least a subset of the parts 510 may be displayed in the 2D view 504, for example the parts that indicate an alert. In some embodiments, the user can set default settings for whether a given scene should be displayed in 3D or 2D, and can include these settings on routes and saved scene views.

Figure 6:
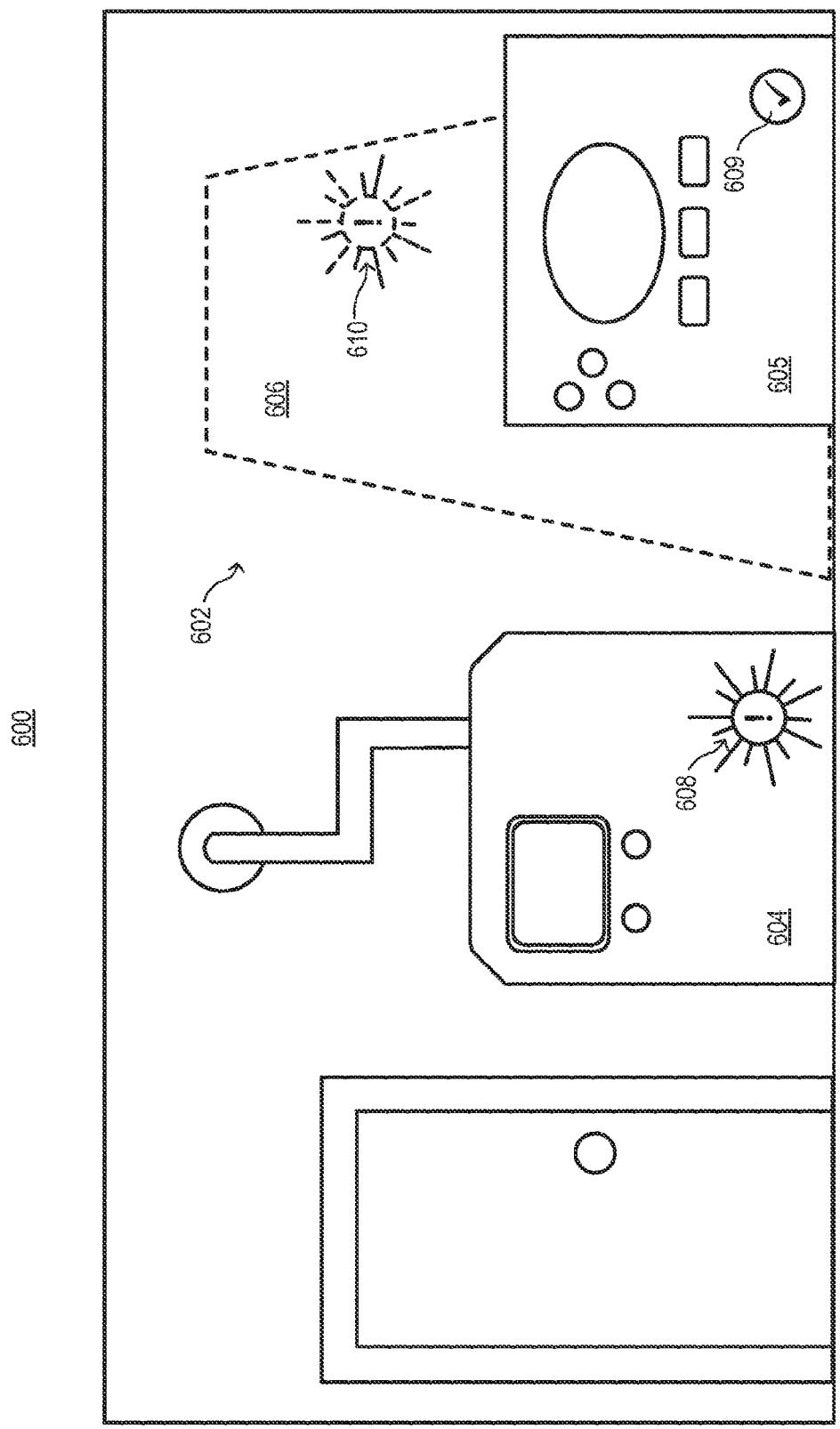
FIG. 6 is a view of a 2D facility model depicting a transparency feature to indicate a machine parameter in a different scene view in accordance with some embodiments.

FIG. 6 is a scene view 600 of a 2D facility model derived from, or implemented as part of, the 3D facility model 100 of FIG. 1, and provided by the facility modeling system 300 of FIG. 3, wherein the 2D facility model depicts a transparency feature 602 to indicate a machine parameter in a different scene in accordance with some embodiments. Generally, when a scene view 600 is selected, the facility modeling system 300 identifies from the plurality of machines associated with the facility, a subset of the machines 604, 605 to be "visible" in the scene view 600. The user may configure which machines are to be included in the subset with user customization settings and filters which are discussed in greater detail with reference to FIG. 8 below. After identifying the subset of machines, the facility modeling system 300 identifies from the plurality of sensors associated with the facility a first subset of sensors associated with the first subset of machines. In some embodiments, the subset of machines to be displayed in the first scene view may be filtered based on machine type, sensor type, sensor status, a combination of these, and the like. The facility modeling system 300 then displays a graphical representation of a portion of the model 100 corresponding to the selected scene view, which includes a graphical representation of the subset of machines 604, 605, and a graphical representation (e.g. icons 608, 609) of each sensor of the first subset of sensors.

However, in some instances it may beneficial for a user to know that nearby parts, machines, areas, facilities, or the like, have a particular sensor status. For example, in the illustrated scene view 600, the subset of machines to be "visible" include machines 604, 605, and graphical representations of these machines are displayed in the scene view 600 regardless of the statuses of their sensors (unless user customization dictates otherwise). As illustrated, machine 606 is in a different room of the facility, and a wall or other obstruction would normally stand between the scene view 600 and the machine 606, such that the machine 606 would not be "visible" in the graphical representation of the model associated with scene view 600. However, a transparency feature 602 can be configured to allow a graphical representation of the machine 606, or certain characteristics of the graphical representation of the machine 606 to "peek through" the current scene view 600, such that they are at least partially "visible' in the scene view 600.

For example, the wall or other obstruction between the scene view 600 and the machine 606 may be displayed as translucent, such that the obstruction is partially or completely see-through. In some embodiments, the transparency feature 602 may be configurable based one sensor status, machine type, location relative to current scene view, obstruction type, a combination of these, and the like. For example, in the illustrated embodiment, the transparency feature 602 is enabled and configured to allow machines having an "attention" or "!" icon 610 to peek through the current scene view 600, and as a result, machine 606 is "visible" in the scene view 600 through translucent obstructions. However, the plurality of machines outside of the subset of machines associated with the scene view 600, that do not have an "attention" or "!" icon 610 are not "visible" in the scene view 600 through translucent obstructions or otherwise. The subset of machines 604, 605 associated with the scene view 600 continue to be "visible" in the current scene view 600 no matter its icon 608, 609. Alternatively, in some embodiments, the transparency feature 602 may further be customizable such that machines 605 indicating that all of the sensors related to the machine 605 are within a "normal" range (such as with a "check mark" icon 609) may be dulled or hidden so as to make machines with "non-normal" sensor statuses more "visible". Further, in some embodiments, an icon may be "visible" through translucent obstructions rather than the machine 606 itself. For example, callouts may be used to indicate notable sensor statuses in locations outside of the current scene view 600, and in some embodiments may be given a size, color, or other visual attribute to indicate the distance from the current scene view 600. The transparency feature 602 helps the user navigate through the facility based on sensor status information by alerting the user to notable sensor statuses outside of the current scene view 600.

Figure 7:
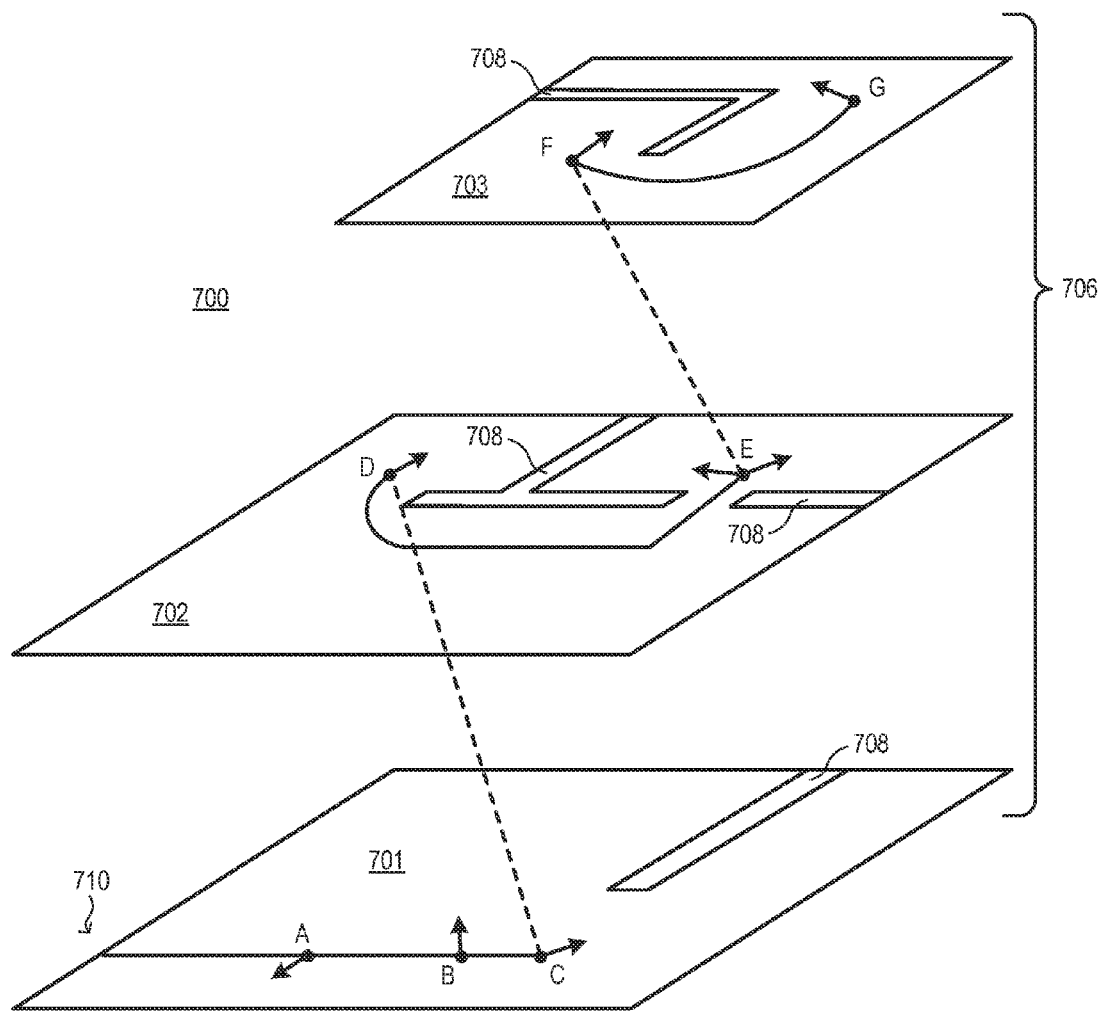
FIG. 7 is a diagram illustrating a predefined route of scene views in accordance with some embodiments.

FIG. 7 illustrates a predefined route 700 of scene views of the 3D facility model 100 of FIG. 1, designated by waypoints A, B, C, D, E, F, G that the facility modeling system 300 of FIG. 3 displays sequentially in accordance with some embodiments. In the illustrated example, the route 700 spans three floors 701, 702, 703 of a facility 706. The route 700 of other embodiments can span multiple facilities, multiple buildings, multiple floors 701, 702, 703, multiple rooms, any combination of these, and the like. Each floor 701, 702, 703 is illustrated as having one or more walls 708. In other routes, various barriers or landmarks may be represented in the route 700 instead of or in addition to walls 708. For example, the route may maneuver around furniture, machines, fixtures, and the like.

The route 700 generally comprises waypoints A, B, C, D, E, F, G that designate at least a sequence, a location, and a view focus for the scenes of the route 700. The route 700 may begin at a home location, at an entrance to the space housing the first waypoint A of the route 700, at the first waypoint A, or the like. The route 700 of the illustrated embodiment begins at an entrance 710 to the floor 701 of the first waypoint A. The route 700 may then employ a first-person viewpoint to the next waypoint B, or the route 700 may switch directly from the scene view of the first waypoint A to the scene view of the second waypoint B. In some embodiments, route 700 may employ a combination of these and other transitions between waypoints A, B, C, D, E, F, G of the route 700.

The view focus is the display perspective of the facility model on the GUI 400 (FIG. 4) for any given scene view. The view focus of each waypoint A, B, C, D, E, F, G is represented in the illustrated example by a directional arrow, but in some embodiments, the view focus may additionally encompass information related to zoom, perspective, and other customizable visual features. In some embodiments, at least one waypoint E comprises multiple scene views; while the different scene views share a location (waypoint E) they comprise different view focuses. The route 700 may be customizable such that the user selects each waypoint A, B, C, D, E, F, G, or the route 700 may be created based on selected parameters. For example, a route 700 could be created based on navigating to all machines that have a level three alert for at least one machine parameter.

A user's progress along route 700 via a GUI, such as GUI 400, may be automated between the waypoints A, B, C, D, E, F, G and scene views based on a timer or preset conditions, or the user may provide user input to progress along the route 700 (e.g. using a cursor to select "next," typing a command, or selecting a waypoint along the route). In some embodiments, the user may utilize navigation controls while viewing a waypoint A, B, C, D, E, F, G, such that the user may get a closer look at a machine within a scene view of a waypoint A, B, C, D, E, F, G or even navigate to a new scene view from the waypoint A, B, C, D, E, F, G, and then proceed to the next waypoint A, B, C, D, E, F, G when the user is ready, by providing user input. While the illustrated route 700 moves through each waypoint A, B, C, D, E, F, G on a given floor 701, 702, 703 before moving to the next floor 701, 702, 703, other routes 700 may move between waypoints A, B, C, D, E, F, G on different floors 701, 702, 703, in different buildings, in different facilities, and in different rooms in any order. In some embodiments the route 700 ends at the last waypoint G. In other embodiments, the route 700 may end with a summary, a menu, a "home" scene, or the like. The method for navigating a route is discussed in greater detail with reference to FIG. 11 below.

Figure 8:
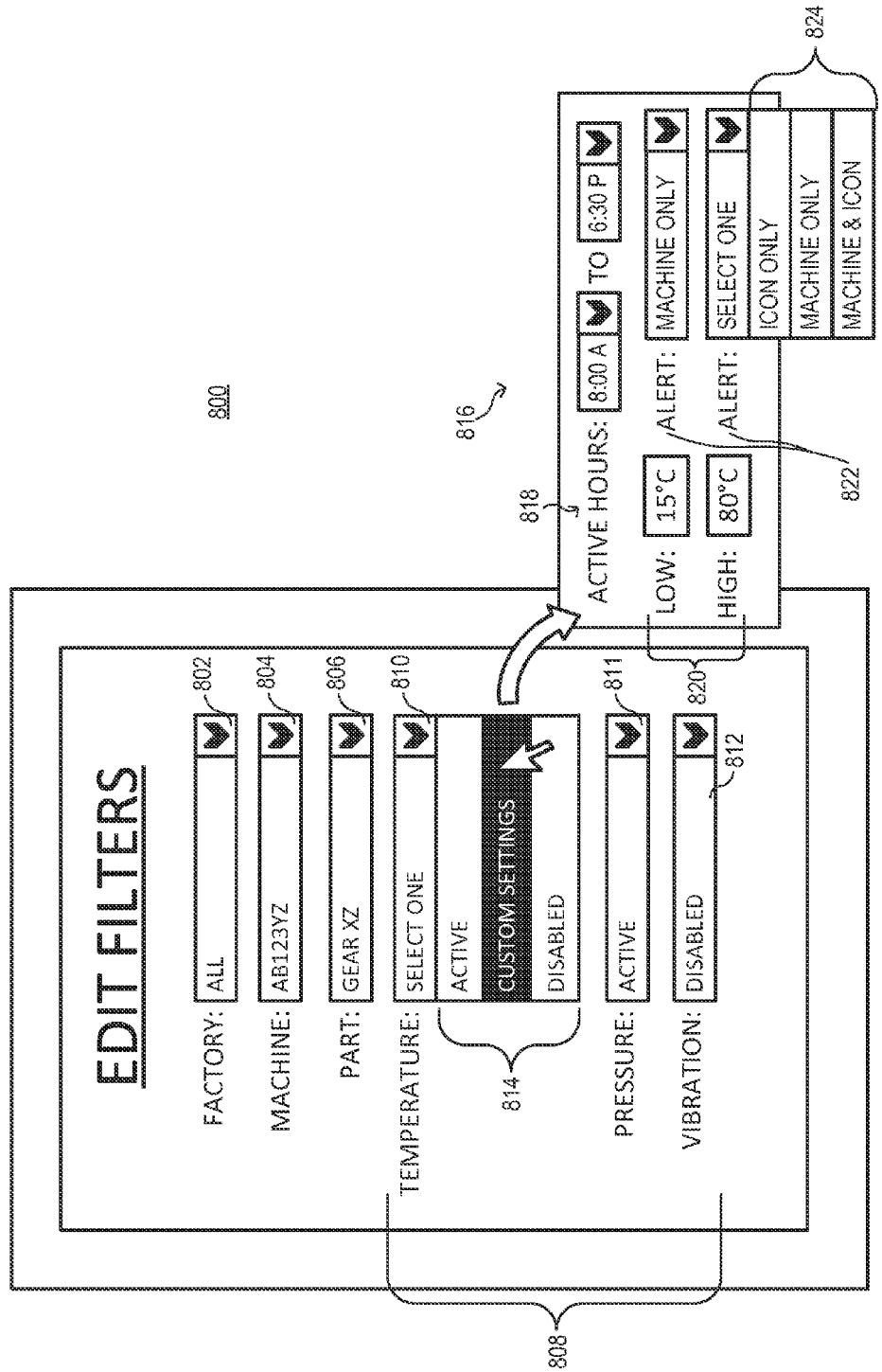
FIG. 8 is a view of example filter customization settings for sensors of a facility model in accordance with some embodiments.

FIG. 8 is a view of example filter customization settings 800 to allow the user to configure how the facility modeling system 300 of FIG. 3 displays the 3D facility model 100 of FIG. 1 in accordance with some embodiments. The customization settings 800 can take on many forms, and are generally available for the user to customize what information is provided and how it is show to tailor the 3D facility model 100 to the user's needs. For example, in some embodiments, customization settings 800 allow the user to define alerts, sensor statuses, facilities, machines, parts, a combination of these, and the like. The illustrated filter customization settings 800 feature pull-down menus to facilitate user configuration of settings related to the facility 802, machine 804, part 806, and sensors 808. Other embodiments may include additional menus, fillable forms, buttons, and options. In the illustrated embodiment all facilities have been selected with the facility pull-down menu 802, so that the user can apply these particular filter settings 800 to all of the facilities, but other filter settings 800 may be applied to individual facilities, or a subset of facilities. Machine AB123YZ has been selected with the machine pull-down menu 804, and part Gear XZ has been selected with the part pull-down menu, so that these particular filter settings 800 only apply to each Gear XZ in each Machine AB123YZ in all of the facilities. Other embodiments may select all machines, all parts, a subset of machines, a subset of parts, or a combination of these.

The sensor pull-down menus 808 may include one menu for each sensor based on the selected facility 802, machine 804, and part 806, for each type of sensor, for each group of sensors, or only for a subset of sensors. In the illustrated embodiment, sensor pull-down menus 808 are provided for temperature 810, pressure 811, and vibration 812, representing the sensors based on the machine parameters being measured. The sensor filter options 814 provided include "Active," "Custom Settings," and "Disabled." In some embodiments, an "Active" setting may mean that the sensor is to be actively collecting machine parameter data according to default settings. "Disabled" setting may mean that the sensor data is not to be collected, communicated, displayed, or a combination of these. The "Custom" settings of the sensor filter options 814 provides additional user input fields 816 that may allow the user to customize how the sensor data is collected, communicated, analyzed, stored, displayed, a combination of these, and the like. In the illustrated embodiment, the additional user input fields 816 include active hour settings 818, threshold level settings 820, and alert settings 822. Other embodiments may include any of a variety of pull-down menus, fillable forms, input fields, search fields, scroll fields, a combination of these, and the like. In the illustrated embodiment, the alert settings 822 allow the user to select from display settings 824, such as "Icon Only" (indicating that only a graphical representation of the sensor displays the alert), "Machine Only" (indicating that only machine displays a visual attribute indicating the alert), and "Machine and Icon" (indicating a combination of these). Other embodiments may include additional display options, for example what icon is displayed, or what visual attribute is displayed, and may include options for an audible alarm or a route created based on an alert.

Figure 9:
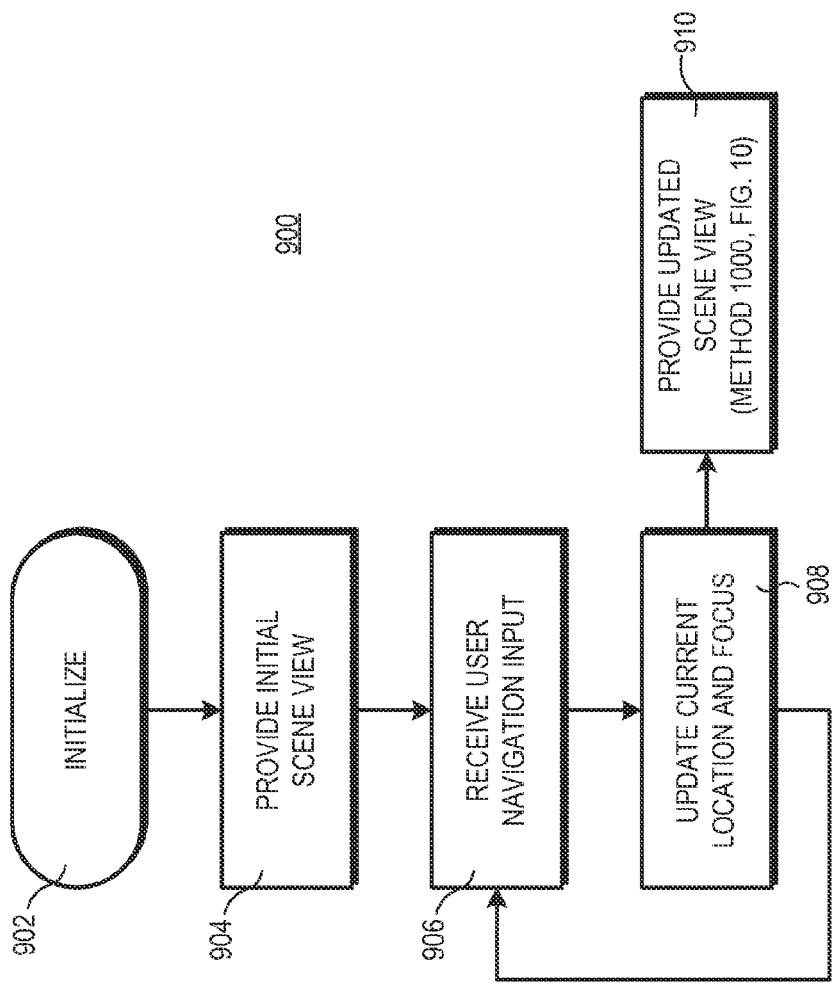
FIG. 9 is a flow diagram illustrating a method for displaying a facility model in accordance with some embodiments.

FIG. 9 is a flow diagram illustrating an example method 900 for displaying a 3D facility model, such as 3D facility model 100 of FIG. 1 in accordance with some embodiments. The method 900 initializes at block 902, whereby the facility modeling system 300 of FIG. 3 is booted. At block 904, the rendering/navigation control module 316 provides the initial scene view, which may be a preset "home" scene, a map of all available facilities (e.g. scene 202 of FIG. 3), or any of a variety of scene views. At block 906, the rendering/navigation control module 316 receives user navigation input via the user interface 320 (FIG. 3), such as pan, zoom, rotate, jump, pop, expand, a combination of these, and the like. At block 908 the rendering/navigation control module 316 updates the current location and view focus in accordance with the user navigation input received at block 906. Following block 908, the rendering/navigation control module 316 may receive additional user input from the user interface 320, thereby repeating blocks 906 and 908, or may proceed to block 910, whereby the rendering/navigation control module 316 provides an updated scene view according to method 1000, described in greater detail with reference to FIG. 10 below.

Figure 10:
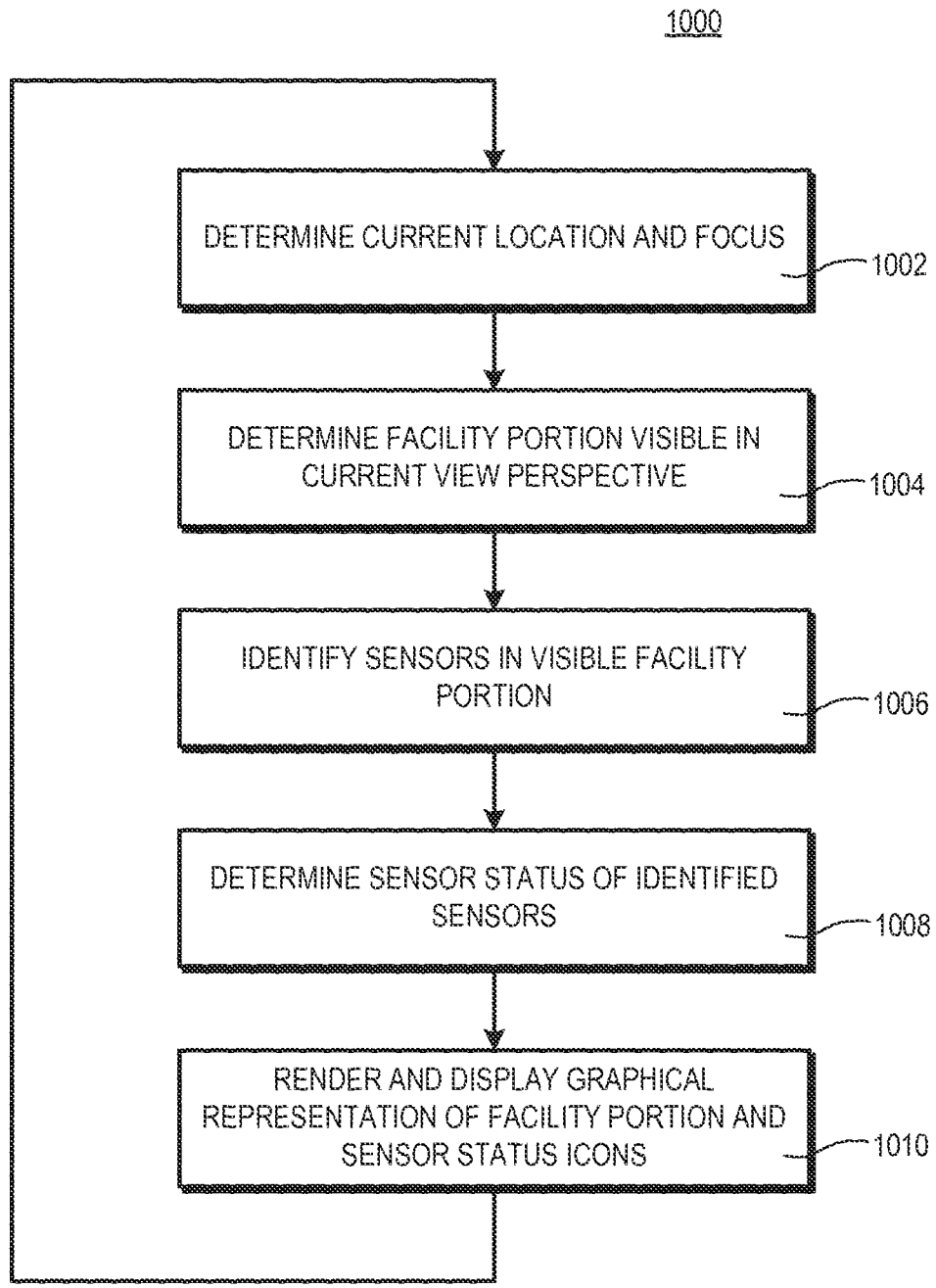
FIG. 10 is a flow diagram illustrating a method for providing an updated scene view in accordance with some embodiments.

FIG. 10 is a flow diagram illustrating an example method 1000 for providing an updated scene view of a 3D facility model, such as 3D facility model 100 of FIG. 1 in accordance with some embodiments. The method 1000 initiates at block 1002, whereby the facility modeling system 300 (FIG. 3) determines the current location and view focus. That is, the facility modeling system 300 determines a location relative to the available maps of the facility, area, etc. and determines the current perspective of the 3D facility model 100. At block 1004, the facility modeling system 300 determines which portion of the facility or facilities is "visible" in the current view perspective. For example, within a given facility, the facility modeling system 300 identifies, from the plurality of machines within the facility, a subset of machines to be "visible" in the current scene view. The subset of machines are located within the boundaries of the scene view created by the view focus, and are included in the portion of the facility that is "visible" in the current view perspective. The subset of machines "visible" in the current scene view may be identified by determining the boundaries of the visible area relative to one or more absolute or relative reference points (e.g., a plotted map or Global Positioning System coordinates) and then determining which machines are within these boundaries based on location information associated with each machine (e.g., Global Positioning System coordinates obtained and stored for each machine), sensor-based location information (e.g., through the use of radio frequency identification (RFID) tagging), through fixed coordinates or positioning relative to a mapping of the facility, and the like.

At block 1006, the facility modeling system 300 identifies the sensors in the "visible" facility portion, and at block 1008 the rendering/navigation control module 316 identifies a sensor status for each of the identified sensors. For example, the rendering/navigation control module 316 may identify, from the plurality of sensors associated with the facility, a subset of sensors associated with the subset of machines that are "visible" in the current scene view. Alternatively, rather than identifying which machines are "visible" within a scene view and then determining which sensors are associated with the identified machines, some or all of the sensors may instead be given independent positioning information (e.g., GPS coordinates or RFID tags) and the sensors visible within a scene view may be determined At block 1010, the facility modeling system 300 renders and displays a graphical representation of the facility portion and sensor status icons, and the method 1000 can return to block 1002 to repeat the steps as needed to provide updated scene views.

Figure 11:
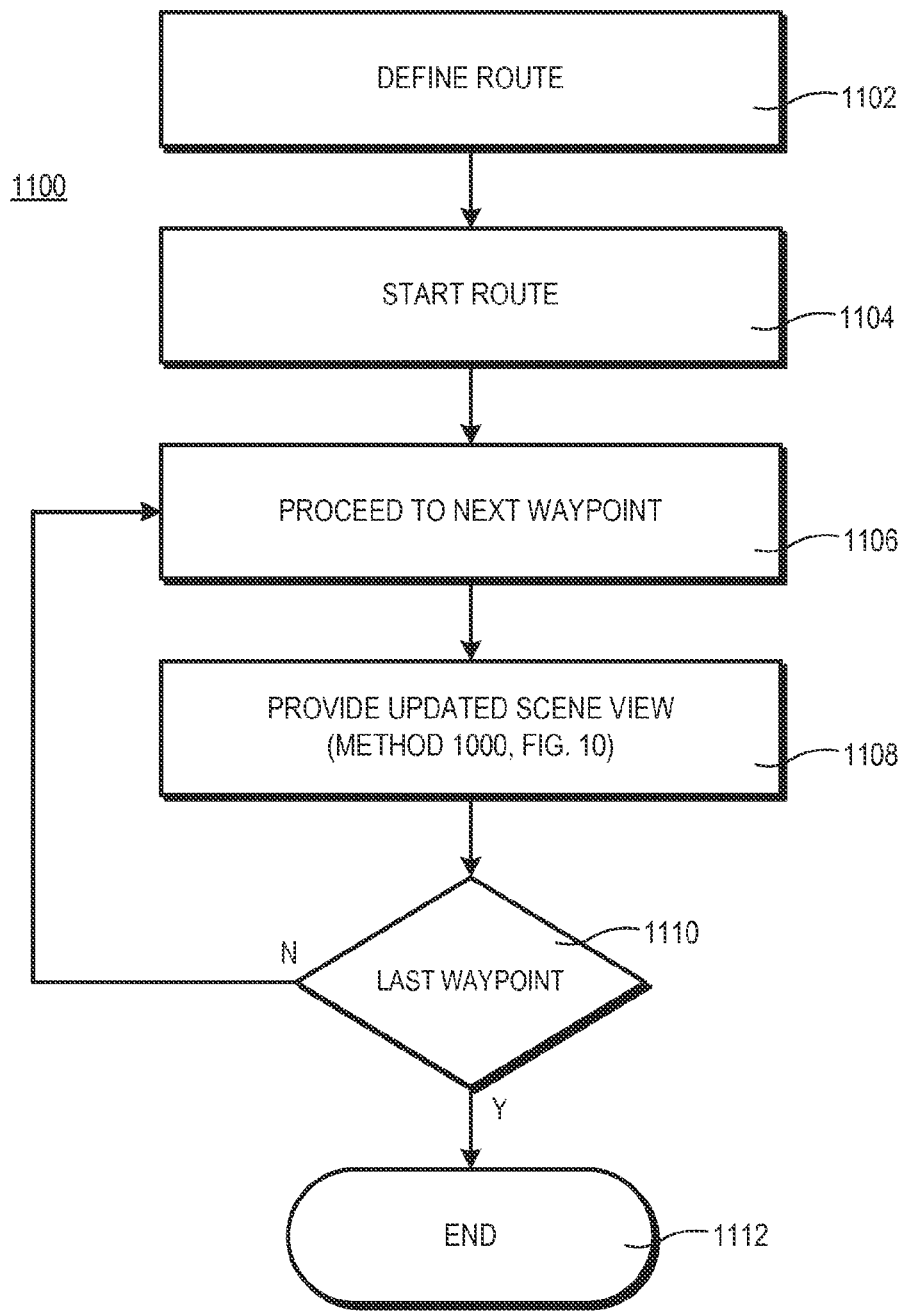
FIG. 11 is a flow diagram illustrating a method for navigating a route through a 3D facility model in accordance with some embodiments.

FIG. 11 is a flow diagram illustrating an example method 1100 for navigating a route, such as route 700 of FIG. 7, in accordance with some embodiments. The method 1100 initiates at block 1102, whereby the route 700 is defined. The route can be defined by a user, may be defined based on sensor statuses, may be a default route, may be a combination of these, and the like. The route is generally defined by a set of waypoints A, B, C, D, E, F, G (FIG. 7) and these waypoints A, B, C, D, E, F, G may be defined well in advance of starting the route 700 at block 1104.

At block 1106, the route proceeds to the next waypoint A, B, C, D, E, F, G in the sequence of waypoints A, B, C, D, E, F, G of the defined route 700. At block 1108, the facility modeling system 300 provides an updated scene view according to method 1000 discussed with reference to FIG. 10 above, whereby the facility modeling system 300 (FIG. 3) renders for display a scene view of the 3D facility model 100 (FIG. 1) in accordance with the location and view focus indicated by the waypoint A, B, C, D, E, F, G. At decision block 1110, the facility modeling system 300 determines whether or not the current waypoint A, B, C, D, E, F, G is the last waypoint. If the current waypoint A, B, C, D, E, F, G is not the last waypoint A, B, C, D, E, F, G, the method 1100 returns to block 1106, and the facility modeling system 300 proceeds to the next waypoint A, B, C, D, E, F, G and repeats blocks 1106, 1107, 1108 to provide updated scene views for each subsequent waypoint A, B, C, D, E, F, G. If at decision block 1110 the current waypoint A, B, C, D, E, F, G is the last waypoint A, B, C, D, E, F, G, the method 1100 ends. At the completion of the method 1100, the facility modeling system 300 may return to a preset screen, a "home" screen, proceed to a next route, prompt the user for input, or the like.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
determining a sensor status for each sensor of the first subset of sensors;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors, wherein the graphical representation of each sensor includes a sensor icon representing the sensor status of the sensor; and
providing for display a graphical representation of at least one metric of the sensor status of a sensor in response to user input indicating a selection of the sensor icon corresponding to the sensor.

2. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
determining a sensor status for each sensor of the first subset of sensors;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors, wherein the graphical representation of each sensor includes a sensor icon representing the sensor status of the sensor;
receiving user input indicating a user configuration for display of the sensor icon based on the sensor status of the sensor; and
configuring the graphical representation of the sensor based on the user configuration.

3. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
determining a sensor status for each sensor of the first subset of sensors;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors, wherein the graphical representation of each sensor includes an icon representing the sensor status of the sensor; and
wherein the graphical representation of a machine of the first subset of machines includes at least one visual attribute based on the sensor status of a sensor sensing machine parameters of the machine.

4. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view by:
 determining a location in the industrial facility and a view focus for the first scene view; and
 determining as the first subset of machines those machines of the plurality of machines having locations within a field of view specified by the location and view focus;
identifying, from the plurality of sensors, a first subset of sensors associated with the first subset of machines; and
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors.

5. The method of claim 4, wherein:
identifying the first subset of sensors comprises:
 determining as the first subset of sensors those sensors of the plurality of sensors sensing machine parameters of machines of the first subset of machines.

6. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines by:
 determining a location in the industrial facility and a view focus for the first scene view; and
 determining as the first subset of sensors those sensors of the plurality of sensors having locations within a field of view specified by the location and view focus; and
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors.

7. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors;
responsive to user navigational input, identifying a second scene view of the multi-dimensional model of the industrial facility;
identifying a second subset of machines visible in the second scene view;
identifying a second subset of the plurality of sensors associated with the second subset of machines; and
providing for display a graphical representation of a second portion of the multi-dimensional model corresponding to the second scene view, the graphical representation of the second portion of the multi-dimensional model including a graphical representation of each machine of the second subset of the machines within the industrial facility and a graphical representation of each sensor of the second subset of sensors.

8. The method of claim 7, wherein the first scene view comprises a three-dimensional (3D) scene view and the second scene view comprises a two-dimensional (2D) scene view.

9. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors
defining a route;
receiving user input to indicate a next waypoint of the route; and
wherein identifying the first scene view of the multi-dimensional model comprises identifying the first scene view as a scene view at the next waypoint.

10. A computer-implemented method comprising:
responsive to user navigational input, identifying a first scene view of a multi-dimensional model of an industrial facility having a plurality of machines and a plurality of sensors, at least a subset of the plurality of sensors sensing machine parameters of machines of the plurality of machines;
identifying, from the plurality of machines, a first subset of machines visible in the first scene view;
identifying, from the plurality of sensors, a first subset of sensors associated with the first subset of machines;
providing for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors;

identifying a machine located at a position beyond that visible in the first scene view; and providing for display as part of the first scene view a graphical representation of the machine by representing obstructions between the machine and the first scene view as translucent.

11. A non-transitory computer readable storage medium embodying a set of executable instructions, the set of executable instructions to manipulate at least one processor to:

responsive to user navigational input, identify a first scene view of a multi-dimensional model of an industrial facility having a plurality of machines and a plurality of sensors, at least a subset of the plurality of sensors sensing machine parameters of machines of the plurality of machines;

identify, from the plurality of machines, a first subset of machines visible in the first scene view;

identify, from the plurality of sensors, a first subset of the plurality of sensors associated with the first subset of machines;

determine a sensor status for each sensor of the first subset of sensors;

provide for display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors, wherein the graphical representation of each sensor includes a sensor icon representing the sensor status of the sensor; and provide for display a graphical representation of at least one metric of the sensor status of a sensor in response to user input indicating a selection of the sensor icon corresponding to the sensor.

12. A system comprising:

a plurality of sensors, at least a subset of the plurality of sensors sensing machine parameters of machines of a plurality of machines in an industrial facility;

a sensor control module in communication with the plurality of sensors to receive a set of sensor status data from at least the subset of the plurality of sensors;

a sensor status database in communication with the sensor control module;

a sensor map database to store data related to locations of the plurality of sensors within the industrial facility;

a facility map database to store data related to a layout of the plurality of machines within the industrial facility;

a user interface;

a display; and a navigation control module in communication with the sensor control module, the sensor status database, the sensor map database, the facility map database, the user interface, and the display, the navigation control module to:

responsive to user navigational input received from the user interface, identify a first scene view of a multi-dimensional model of the industrial facility;

identify, from the plurality of machines, a first subset of machines visible in the first scene view;

identify, from the plurality of sensors, a first subset of the plurality of sensors associated with the first subset of machines;

provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors; and determine a sensor status for each sensor of the first subset of sensors; and wherein the graphical representation of a sensor includes an icon representing the sensor status of the sensor.

13. The system of claim 12, wherein the navigation control module further is to:

provide for display a graphical representation of at least one metric of the sensor status of a sensor in response to user input indicating a selection of the sensor icon corresponding to the sensor.

14. The system of claim 12, wherein the navigation control module further is to:

receive user input indicating a user configuration for display of the sensor icon based on the sensor status of the sensor; and configure the graphical representation of the sensor based on the user configuration.

15. The system of claim 12, wherein the graphical representation of a machine of the first subset of machines includes at least one visual attribute based on the sensor status of a sensor sensing machine parameters of the machine.

16. A system comprising:

a plurality of sensors, at least a subset of the plurality of sensors sensing machine parameters of machines of a plurality of machines in an industrial facility;

a sensor control module in communication with the plurality of sensors to receive a set of sensor status data from at least the subset of the plurality of sensors;

a sensor status database in communication with the sensor control module;

a sensor map database to store data related to locations of the plurality of sensors within the industrial facility;

a facility map database to store data related to a layout of the plurality of machines within the industrial facility;

a user interface;

a display; and a navigation control module in communication with the sensor control module, the sensor status database, the sensor map database, the facility map database, the user interface, and the display, the navigation control module to:

responsive to user navigational input received from the user interface, identify a first scene view of a multi-dimensional model of the industrial facility;

identify, from the plurality of machines, a first subset of machines visible in the first scene view by:

determining a location in the industrial facility and a view focus for the first scene view; and determining as the first subset of machines those machines of the plurality of machines having locations within a field of view specified by the location and view focus;

identify, from the plurality of sensors, a first subset of the plurality of sensors associated with the first subset of machines; and provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors.

17. The system of claim 16, the navigation control module is to identify the first subset of sensors by:
determining as the first subset of sensors those sensors of the plurality of sensors sensing machine parameters of machines of the first subset of machines.

18. A system comprising:
a plurality of sensors, at least a subset of the plurality of sensors sensing machine parameters of machines of a plurality of machines in an industrial facility;
a sensor control module in communication with the plurality of sensors to receive a set of sensor status data from at least the subset of the plurality of sensors;
a sensor status database in communication with the sensor control module;
a sensor map database to store data related to locations of the plurality of sensors within the industrial facility;
a facility map database to store data related to a layout of the plurality of machines within the industrial facility;
a user interface;
a display; and
a navigation control module in communication with the sensor control module, the sensor status database, the sensor map database, the facility map database, the user interface, and the display, the navigation control module to:
responsive to user navigational input received from the user interface, identify a first scene view of a multi-dimensional model of the industrial facility;
identify, from the plurality of machines, a first subset of machines visible in the first scene view;
identify, from the plurality of sensors, a first subset of the plurality of sensors associated with the first subset of machines by:
determining a location in the industrial facility and a view focus for the first scene view; and
determining as the first subset of sensors those sensors of the plurality of sensors having locations within a field of view specified by the location and view focus; and
provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors.

19. A system comprising:
a plurality of sensors, at least a subset of the plurality of sensors sensing machine parameters of machines of a plurality of machines in an industrial facility;
a sensor control module in communication with the plurality of sensors to receive a set of sensor status data from at least the subset of the plurality of sensors;
a sensor status database in communication with the sensor control module;
a sensor map database to store data related to locations of the plurality of sensors within the industrial facility;
a facility map database to store data related to a layout of the plurality of machines within the industrial facility;
a user interface;
a display; and
a navigation control module in communication with the sensor control module, the sensor status database, the sensor map database, the facility map database, the user interface, and the display, the navigation control module to:
responsive to user navigational input received from the user interface, identify a first scene view of a multi-dimensional model of the industrial facility;
identify, from the plurality of machines, a first subset of machines visible in the first scene view;
identify, from the plurality of sensors, a first subset of the plurality of sensors associated with the first subset of machines;
provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors;
responsive to user navigational input, identify a second scene view of the multi-dimensional model of the industrial facility;
identify a second subset of machines visible in the second scene view;
identify a second subset of the plurality of sensors associated with the second subset of machines; and
provide for display a graphical representation of a second portion of the multi-dimensional model corresponding to the second scene view, the graphical representation of the second portion of the multi-dimensional model including a graphical representation of each machine of the second subset of the machines within the industrial facility and a graphical representation of each sensor of the second subset of sensors.

20. The system of claim 19, wherein the first scene view comprises a three-dimensional (3D) scene view and the second scene view comprises a two-dimensional (2D) scene view.

21. A system comprising:
a plurality of sensors, at least a subset of the plurality of sensors sensing machine parameters of machines of a plurality of machines in an industrial facility;
a sensor control module in communication with the plurality of sensors to receive a set of sensor status data from at least the subset of the plurality of sensors;
a sensor status database in communication with the sensor control module;
a sensor map database to store data related to locations of the plurality of sensors within the industrial facility;
a facility map database to store data related to a layout of the plurality of machines within the industrial facility;
a user interface;
a display; and
a navigation control module in communication with the sensor control module, the sensor status database, the sensor map database, the facility map database, the user interface, and the display, the navigation control module to:
responsive to user navigational input received from the user interface, identify a first scene view of a multi-dimensional model of the industrial facility;
identify, from the plurality of machines, a first subset of machines visible in the first scene view;

identify, from the plurality of sensors, a first subset of the plurality of sensors associated with the first subset of machines;

provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors;

define a route responsive to user input;

receive user input to indicate a next waypoint of the route; and identify the first scene view of the multi-dimensional model as a scene view of the next waypoint.

22. A system comprising:

a plurality of sensors, at least a subset of the plurality of sensors sensing machine parameters of machines of a plurality of machines in an industrial facility;

a sensor control module in communication with the plurality of sensors to receive a set of sensor status data from at least the subset of the plurality of sensors;

a sensor status database in communication with the sensor control module;

a sensor map database to store data related to locations of the plurality of sensors within the industrial facility;

a facility map database to store data related to a layout of the plurality of machines within the industrial facility;

a user interface;

a display; and a navigation control module in communication with the sensor control module, the sensor status database, the sensor map database, the facility map database, the user interface, and the display, the navigation control module to:

responsive to user navigational input received from the user interface, identify a first scene view of a multi-dimensional model of the industrial facility;

identify, from the plurality of machines, a first subset of machines visible in the first scene view;

identify, from the plurality of sensors, a first subset of the plurality of sensors associated with the first subset of machines;

provide to the display a graphical representation of a first portion of the multi-dimensional model corresponding to the first scene view, the graphical representation of the first portion of the multi-dimensional model including a graphical representation of each machine of the first subset of the machines within the industrial facility and a graphical representation of each sensor of the first subset of sensors;

identify a machine located at a position beyond that visible in the first scene view; and provide for display as part of the first scene view a graphical representation of the machine by representing obstructions between the machine and the first scene view as translucent.

\* \* \* \* \*